United States Patent

Reid

[11] 4,415,391
[45] Nov. 15, 1983

[54] REINFORCED MOLDED RUBBER MUFFLER HANGER AND METHOD OF MAKING OF SAME

[76] Inventor: Glenn J. Reid, 2270 Chestnut, Bloomfield Hills, Mich. 48084

[21] Appl. No.: 366,029

[22] Filed: Apr. 6, 1982

[51] Int. Cl.³ .............................................. B32B 31/00
[52] U.S. Cl. .................................... 156/187; 156/191; 156/194; 156/212; 156/215; 156/245; 264/257; 248/60; 267/63 R; 267/153
[58] Field of Search .......... 248/60; 267/63 R, 57.1 R, 267/153; 264/257, 258; 156/184, 187–188, 190–192, 194, 245, 287, 212, 215

[56] References Cited

U.S. PATENT DOCUMENTS

| | | | |
|---|---|---|---|
| 2,157,093 | 5/1939 | Bemis | 264/257 X |
| 2,267,431 | 12/1941 | Steensen | 248/60 |
| 2,812,008 | 11/1957 | Bright | 264/257 X |
| 2,995,781 | 8/1961 | Sipler | 156/294 X |
| 4,116,411 | 9/1978 | Masuda | 248/60 |

Primary Examiner—David A. Simmons
Attorney, Agent, or Firm—Krass, Young & Schivley

[57] ABSTRACT

A molded synthetic rubber muffler or exhaust component hanger having a molded-in nylon reinforcing loop around the circumferential surface thereof and manufactured according to a method which involves at least the steps of preparing a preform of uncured synthetic rubber which approximates the shape of the finished article, preparing a wrapping loop of synthetic rubber coated nylon the circumferential size of which accurately conforms to the circumferential dimension of the finished article but is slightly greater than the same circumferential dimension of the preform, placing the loop on the preform and compression molding the combination to unite the rubber constituents of each and to expand the preform as to fully fill out the nylon loop.

7 Claims, 4 Drawing Figures

REINFORCED MOLDED RUBBER MUFFLER HANGER AND METHOD OF MAKING OF SAME

TECHNICAL FIELD

This invention relates to reinforced load-bearing elastic articles such as muffler hangers and to a method of manufacturing such articles so as to provide superior load-bearing characteristics and longer service life.

BACKGROUND ART

U.S. Pat. No. 4,116,411 discloses a hanger device for mufflers and/or exhaust pipes comprising a rubber or rubber like elastic block element having apertures to receive the hooked end portions of rod members extending between a vehicle frame and the exhaust pipe or other suspended article. A problem associated with such elastic devices arises out of the concentration of the load in the area immediately adjacent the rod-receiving apertures. Such load concentration have been found to result in tearing of the elastic block, the tear or fracture, because of the cyclical or vibratory nature of the load, ultimately extending through to the outer circumferential surface of the device. At this time the device becomes useless and must be replaced.

DISCLOSURE OF THE INVENTION

According to one aspect of the invention, I have provided an improved elastic muffler and/or exhaust pipe hanger device which exhibits superior load-bearing characteristics and longer service life. This is accomplished by molding into the article a loop of web-like reinforcing material such as nylon, which loop is caused to lie just below the surface of the elastic article to provide circumferential strength and to resist the aforementioned tearing phenomenon which is associated with the prior art devices.

According to another aspect of the invention, I have conceived and developed a method for manufacturing molded load-bearing articles such as muffler hangers. In general, this method comprises the preparation of a preform of uncured elastic material which approximates the shape of the finished article, preparing a wrapping loop which is made up of a reinforcing material such as nylon webbing, said loop being coated with the uncured elastic material which also makes up the preform, placing the loop on the preform so as to contact and circumscribe a circumferential surface thereof and thereafter compression molding the preform and loop as a combination to cure the elastic material and unify the loop with the preform.

My invention may be best understood by reference to the following specification which is to be taken with the accompanying drawings.

DETAILED DESCRIPTION OF THE SPECIFIC EMBODIMENT

Figure 4:
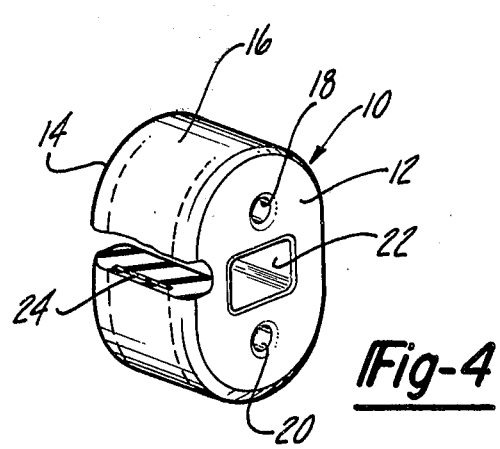
FIG. 4 is a perspective drawing, partly cut away, of a finished muffler hanger manufactured in accordance with the subject invention.

Referring to the drawings and particularly to FIG. 4, there is shown a molded synthetic rubber article 10 which preferably serves as a hanger device for mufflers and/or other components of an automotive exhaust system. Article 10 exhibits parallel planar exterior surfaces 12 and 14 and a smooth continuous circumferential surface 16. The article 10 is generally oblong in shape. Apertures 18 and 20 extend between the planar surfaces 12 and 14 of the article to receive rods. A central aperture 22 also extends between the planar surfaces 12 and 14 to reduce the quantity of material in the article to make it lighter and to tune the article to damp out certain frequencies of vibration. Molded into the article 10 just beneath the circumferential surface 16 is a nylon reinforcement loop 24 which serves to provide superior load carrying capabilities and to lengthen the service life of the article 10 as generally described above.

Figure 1:
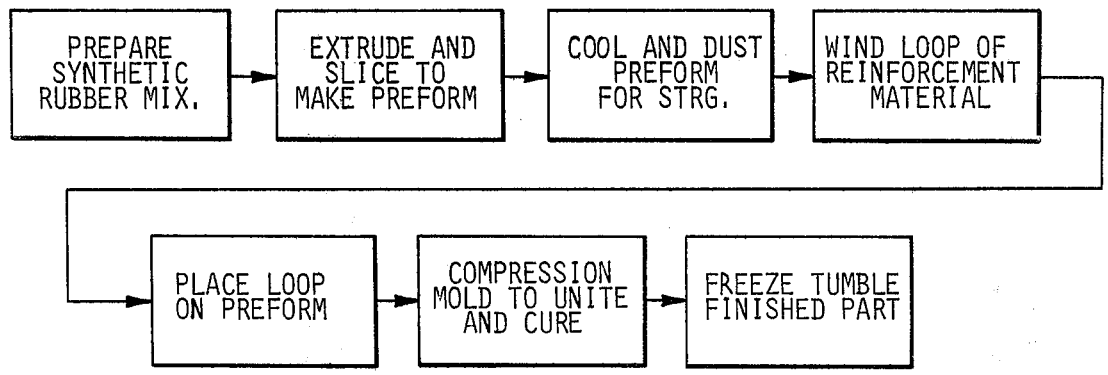
FIG. 1 is a flow chart of steps involved in a complete and preferred method of manufacture molded elastic articles in accordance with the invention.
Figure 2:
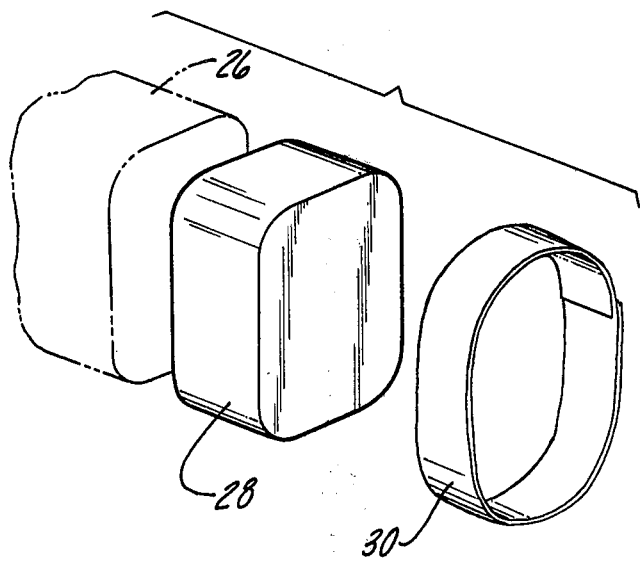
FIG. 2 is a perspective drawing of a preform and circumferential loop prior to unification.
Figure 3:
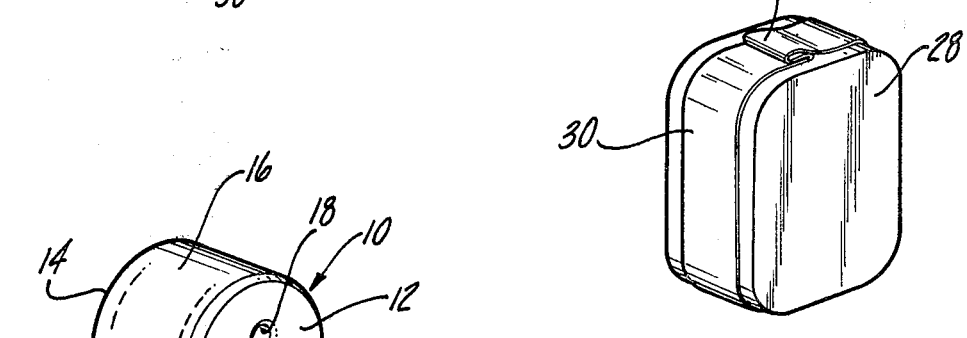
FIG. 3 shows the disposition of the uncured loop on the uncured preform.

Referring now to FIGS. 1–3, the article is made in accordance with the following process steps.

First, I prepare a batch of snythetic rubber material such as EPDM having the desired density and other physical characteristics compatible with the finished article 10 and also suitable for use in an extrusion process. Next, I extrude the material in a conventional vacuum extension fashion to form a continuous void-free billet 26 having a shape and circumferential dimension which approximates the finished article but, as regards to the circumferential dimension, is slightly smaller than the desired circumferential dimension of the finished article 10. Next I slice off of the billet a preform 28 the mass or weight of which is closely controlled; i.e. within one-half gram, to approximate the mass or weight of the finished article 10 when combined with an additional component as hereinafter described. The preform 28 is, at this point, uncured EPDM and exhibits a certain tackiness as will be apparent to those skilled in the synthetic rubber molding arts.

Next, I form a loop 30 of EPDM coated nylon tape, the circumferential dimension of which is identical with the desired circumferential dimension around surface 16 of the finished article 10. The uncured EPDM coating of loop 30 causes it to exhibit the same tackiness or stickiness of the preform 28. Because the circumferential dimension of the preform 28 is smaller than that of the finished article 10, the loop 30 fits easily around the circumference as shown in FIG. 3 and, in fact, exhibits sufficient surplus in the circumferential dimension to permit a fold or tuck 32 to be taken at some convenient point to cause the loop 30 to contact and closely follow the circumferential surface of the perform 28.

As shown in FIG. 1, it is common to store the preforms 28 in batch quantities between the extrusion process and the steps of winding and locating the loops 30 on the preforms 28. If this is necessary, I prefer to cool the preforms 28 and dust them with a stearate powder to prevent the preforms from sticking together while in storage.

Although FIG. 3 illustrates a preform 28 of continously convex circumferential configuration, it is also possible to form the preform 28 by means of the extrusion die so as to exhibit concavities at the top and bottom portions of the circumferential surface thereby to effectively lengthen the circumferential surface to approximate the circumferential length of the loop 30. By this modification one can eliminate the need for the tuck 32.

The next step is to place the combined uncured preform 28 and loop 30 into a compression mold and to effectively unite the two by curing together the EPDM synthetic rubber coating of the loop with the EPDM material of the preform 28. This step also involves compressing the preform 28 so that the circumferential dimension is enlarged to completely fill out the loop 30 effectively cause the nylon band 24 of the finished article 10 to lie slightly beneath the cured rubber surface of the finished article. The apertures 18, 20 and 22 are also formed during the compression molding step and this contributes to the outward circumferential expansion of the preform.

After the compression molding step, the finished article is ejected or removed by hand from the mold and placed in a nitrogen freezing tumbler to cool and tumble off the flashing from the finished article.

Other modifications and uses for the present invention will become apparent to one skilled in the art upon a study of the specifications, drawings and claims.

I claim:

1. The method of manufacturing a load-bearing reinforced elastic article comprising the steps of:
   preparing a preform of uncured elastic material approximating the shape of the finished article;
   preparing a wrapping loop made up of a reinforcing material coated with said uncured elastic material; the loop size accurately conforming substantially to an exterior circumferential dimension of the finished article but being slightly greater than the same circumferential dimension of the preform;
   the combined mass of the preform and loop accurately conforming to the mass of the finished article;
   placing the loop on the preform so as to contact and circumscribe the said circumferential dimension; and
   compression molding the combination of preform and loop to cure and physically unify same and to expand the circumferential dimension of the preform to fill the loop.

2. The method of claim 1 wherein the elastic material is synthetic rubber.

3. The method of claim 1 wherein the reinforcing material is nylon.

4. The method of claim 1 wherein the step of compression molding including the formation of one or more apertures in the preform between surfaces other than the circumferential surface contacted by the loop.

5. A reinforced, molded article of elastic material intended for load-bearing applications and produced according to the method which involves the steps of:
   preparing a preform of uncured elastic material approximating the shape of the finished article;
   preparing a wrapping loop made up of a reinforcing material coated with said uncured elastic material; the loop size conforming to substantially accurately in external circumferential dimension of the finished article but being slightly greater than the same circumferential dimension of the preform;
   the combined mass of the preform and loop accurately conforming to the mass of the finished article;
   placing the loop on the preform so as to contact and circumscribe the said circumferential dimension; and
   compression molding the combination of preform and loop to cure and physically unify same and to expand the circumferential dimension of the preform to fill the loop.

6. A reinforced molded article of elastic material as set forth in claim 5 and produced according to the method as set forth in claim 5 but further including the step of forming one or more apertures in the preform during the compression molding step, said apertures being located in surfaces other than the circumferential surface contacted by the loop.

7. A reinforced synthetic rubber muffler hanger comprising a body of cured synthetic rubber having two parallel planar faces and a substantially continuous circumferential surface and at least two rod receiving apertures extending between said planar surfaces, and a nylon reinforcement loop in substantial circumferential coextensivity with said circumferential surface integrated into said body slightly beneath the surface thereof and surrounded by a relatively thin layer of said cured synthetic rubber material.

* * * * *